United States Patent
Kubo

(10) Patent No.: US 7,105,936 B2
(45) Date of Patent: Sep. 12, 2006

(54) GENERATOR CONTROL APPARATUS AND METHOD FOR AUTOMOTIVE VEHICLE

(75) Inventor: Asami Kubo, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/126,219

(22) Filed: May 11, 2005

(65) Prior Publication Data

US 2005/0282065 A1    Dec. 22, 2005

(30) Foreign Application Priority Data

Jun. 22, 2004    (JP) .............................. 2004-183167

(51) Int. Cl.
*H02J 7/00* (2006.01)
(52) U.S. Cl. ........................ 290/32; 320/104
(58) Field of Classification Search ............... None
See application file for complete search history.

(56) References Cited

U.S. PATENT DOCUMENTS

| | | | |
|---|---|---|---|
| 5,079,716 A * | 1/1992 | Lenhardt et al. ............ 320/153 |
| 5,637,985 A * | 6/1997 | Kakizaki et al. ............... 322/28 |
| 6,249,106 B1 * | 6/2001 | Turner et al. ................ 320/136 |
| 6,294,843 B1 * | 9/2001 | Kato et al. ................. 290/40 C |
| 6,404,163 B1 * | 6/2002 | Kapsokavathis et al. .... 320/104 |
| 6,809,501 B1 * | 10/2004 | Kapsokavathis et al. .... 320/132 |
| 6,936,995 B1 * | 8/2005 | Kapsokavathis et al. .... 320/132 |

FOREIGN PATENT DOCUMENTS

| | | | | |
|---|---|---|---|---|
| JP | 07227047 A | * | 8/1995 |
| JP | 3305850 B2 | | 5/2002 |
| JP | 2005045928 A | * | 2/2005 |

* cited by examiner

*Primary Examiner*—Joseph Waks
(74) *Attorney, Agent, or Firm*—Foley & Lardner LLP

(57) ABSTRACT

In a generator control apparatus for a vehicle, the control apparatus includes an engine; an intake air temperature sensing section configured to sense a temperature of intake air of the engine; an engine startup temperature-state determining section configured to determine whether the engine is in warm-up state, at the time of startup of the engine; a battery; a battery liquid temperature estimating section configured to estimate a liquid temperature of the battery; a battery liquid temperature storing section configured to store the battery liquid temperature estimated by the battery liquid temperature estimating section; and a generator configured to charge the battery in accordance with the estimated battery liquid temperature. Moreover, in this control apparatus, the battery liquid temperature estimating section is configured to estimate, at the time of engine startup in warm-up state, the battery liquid temperature to be the lower one of the sensed intake air temperature and a battery liquid temperature previously stored by the battery liquid temperature storing section, by comparing the sensed intake air temperature with the previously stored battery liquid temperature.

16 Claims, 2 Drawing Sheets

GENERATOR CONTROL APPARATUS AND METHOD FOR AUTOMOTIVE VEHICLE

BACKGROUND OF THE INVENTION a) Field of the Invention

The present invention relates to control apparatus and method for a generator of an automotive vehicle.

b) Description of the Related Art

A Japanese Patent No. 3305850 issued on May 10, 2002 exemplifies a previously proposed alternator control apparatus for an automotive vehicle. In this proposed alternator control apparatus, intake air temperature of an engine is adopted as an estimated temperature of a battery, thereby is adopted as a control parameter for controlling the alternator. Moreover, when the vehicle is traveling at low velocity, the intake air temperature is determined to be higher than an actual temperature of the battery. Hence, the estimated battery temperature is so corrected as to be reduced. On the other hand, when the vehicle is traveling at high velocity, the intake air temperature is determined to be lower than the actual temperature of the battery. Hence, the estimated battery temperature is so corrected as to be increased. Furthermore, in the case where a cooling water temperature of the engine is higher than a predetermined value, the estimated battery temperature is also corrected so as to be increased.

SUMMARY OF THE INVENTION

However, in the above-described previously proposed alternator control apparatus, in the case where the cooling water temperature of the engine is higher than the predetermined value and hence the estimated battery temperature is corrected to be increased, there is a possibility that the estimated battery temperature is calculated to be higher value than the actual battery temperature, in a warm-up state of the engine. As a result, when an open air (or, outside air) temperature is relatively low, there is a possibility that a charging shortage of the battery occurs (i.e., the battery becomes in an insufficient state of charge (or, insufficiently charged state)). This is mainly caused by the following reasons. A temperature of intake air in the warm-up state differs from a temperature of intake air in a cold state, especially in a low vehicle speed region, even under the condition of an identical open air temperature. Namely, the temperature of intake air in the warm-up state is detected higher than that in the cold state, due to a backflow of heat within an engine room. Moreover, the actual temperature of the battery is difficult to rise in a short while in conformity with ambient temperature.

It is, therefore, an object of the present invention to provide control apparatus or method capable of effectively controlling a generator of the vehicle.

According to one aspect of the present invention, there is provided a generator control apparatus for a vehicle, comprising: an engine; an intake air temperature sensing section configured to sense a temperature of intake air of the engine; an engine startup temperature-state determining section configured to determine whether the engine is in warm-up state, at the time of startup of the engine; a battery; a battery liquid temperature estimating section configured to estimate a liquid temperature of the battery; a battery liquid temperature storing section configured to store the battery liquid temperature estimated by the battery liquid temperature estimating section, the battery liquid temperature estimating section being configured to estimate, at the time of engine startup in warm-up state, the battery liquid temperature to be the lower one of the sensed intake air temperature and a battery liquid temperature previously stored by the battery liquid temperature storing section, by comparing the sensed intake air temperature with the previously stored battery liquid temperature; and a generator configured to charge the battery in accordance with the estimated battery liquid temperature.

According to another aspect of the present invention, there is provided a generator control method for a vehicle, comprising: sensing a temperature of intake air of an engine at the time of startup of the engine; determining whether the engine is in warm-up state, at the time of startup of the engine; estimating, at the time of engine startup in warm-up state, a battery liquid temperature to be the lower one of the sensed intake air temperature and a previously stored battery liquid temperature, by comparing the sensed intake air temperature with the previously stored battery liquid temperature; storing the estimated battery liquid temperature; and charging the battery in accordance with the estimated battery liquid temperature.

According to still another aspect of the present invention, there is provided a generator control apparatus for a vehicle, comprising: an engine; intake air temperature sensing means for sensing a temperature of intake air of the engine; engine startup temperature-state determining means for determining whether the engine is in warm-up state, at the time of startup of the engine; a battery; battery liquid temperature estimating means for estimating a liquid temperature of the battery; battery liquid temperature storing means for storing the battery liquid temperature estimated by the battery liquid temperature estimating means, the battery liquid temperature estimating means being configured to estimate, at the time of engine startup in warm-up state, the battery liquid temperature to be the lower one of the sensed intake air temperature and a battery liquid temperature previously stored by the battery liquid temperature storing means, by comparing the sensed intake air temperature with the previously stored battery liquid temperature; and generation means for charging the battery in accordance with the estimated battery liquid temperature.

The other objects and features of this invention will become understood from the following description with reference to the accompanying drawings.

DETAILED DESCRIPTION OF THE INVENTION

Figure 1:
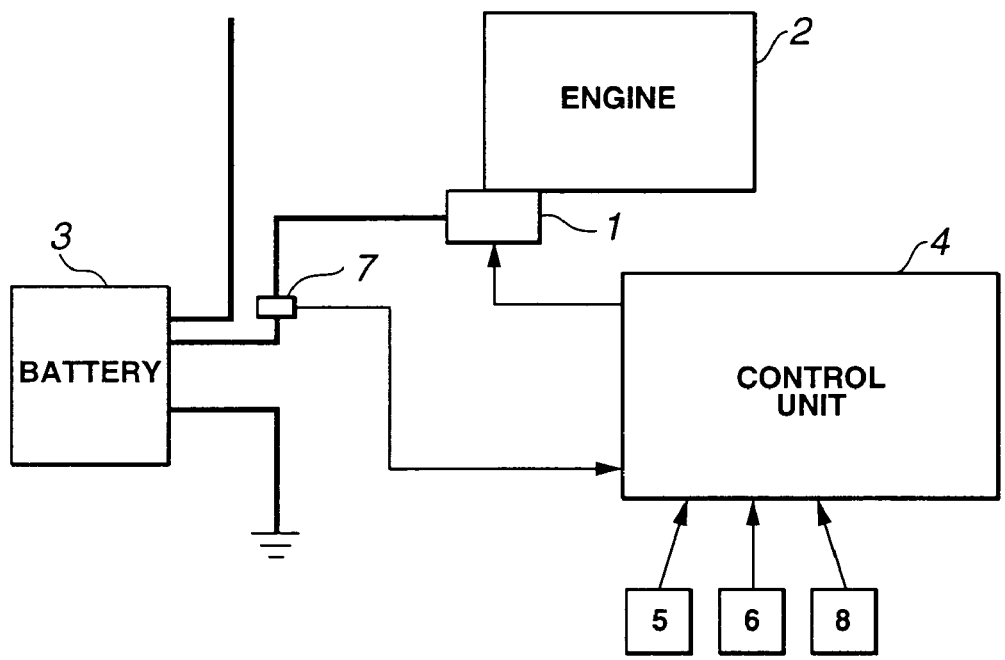
FIG. 1 is a schematic diagram representing a configuration of a first embodiment of a generator control apparatus for a vehicle according to the present invention.

Reference will hereinafter be made to the drawings in order to facilitate a better understanding of the present invention. FIG. 1 is a schematic diagram representing a configuration of a first embodiment of a generator control apparatus for a vehicle according to the present invention.

An alternator 1 which functions as a generator for the vehicle is mechanically coupled with a crank shaft (not shown) of an engine 2 mounted in the vehicle, through a belt and pulleys (not shown). Alternator (or, generator) 1 is electrically connected with a battery 3 mounted in the vehicle, and battery 3 can be charged by electric power generated by alternator 1. Moreover, alternator 1 is controlled according to a generation-voltage command value derived from a control unit 4. In addition, alternator 1 includes an IC regulator which adjusts (or, controls) the charging at suitable predetermined levels while detecting voltages of battery 3.

Control unit 4 receives various information signals of the vehicle, such as signals from a water temperature sensor 5, an intake air temperature sensor 6, a current sensor 7, a voltage sensor 8, a crank angle sensor (not shown), and a throttle sensor (not shown). Water temperature sensor 5 serves to sense (or, detect) a temperature of cooling water (or, coolant) of engine 2, and corresponds to an engine water temperature sensing section (or, means). Intake air temperature sensor 6 serves to sense a temperature of intake air of engine 2, and corresponds to an intake air temperature sensing section (or, means). Current sensor 7 serves to sense an amount of current (i.e., charging current) passing (or, running) from alternator 1 to battery 3. Voltage sensor 8 serves to sense a voltage of battery 3. Then, control unit 4 calculates the generation-voltage command value for alternator 1, on the basis of such various information signals of the vehicle. In addition, intake air temperature sensor 6 may be, for example, a sensor included in an air flow meter (not shown), as far as temperature within a flow passage of intake air in engine 2 is sensed.

It can be proposed to use parameters, for example, a running (or, traveling) state of the vehicle, a charged status (i.e., charge amount) of battery 3, and a liquid temperature of battery 3 (i.e., a temperature of battery liquid, or battery temperature) in order to determine generation voltage (i.e., voltage of (electric power) generation of alternator 1) for performing the generation control for alternator 1.

Figure 2:
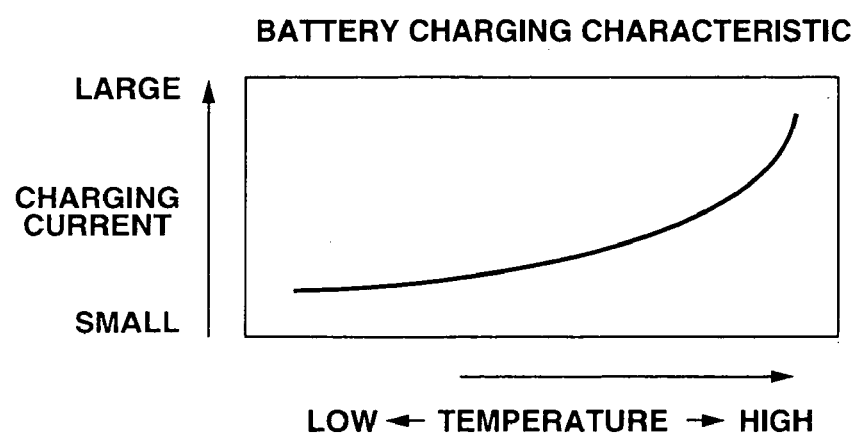
FIG. 2 is a diagram representing the characteristic of charging of a battery.

As the generation voltage of the alternator becomes higher, charging ratio (or, amount) to the battery (i.e., charging speed for charging the battery) becomes higher. Moreover, as shown in FIG. 2, the battery becomes more difficult to be charged as the liquid temperature of the battery becomes lower. Hence, in the case where the charged status (i.e. condition of charge) of the battery is relatively low (or, poor), or the liquid temperature of the battery is relatively low, it is favorable to accelerate (or, boost) the charging of the battery by increasing the generation voltage of the alternator as executed in this embodiment, and thereby to prevent an insufficient status of charge and weak or dead (charged) status of the battery.

Moreover, the liquid temperature of the battery becomes an important parameter (i.e., works as an important parameter), also when estimating (or judging, or calculating) the charged status of the battery. In order to sense this liquid temperature of the battery, it is effective that a temperature sensor is attached in the battery. However, if the liquid temperature can be estimated without using such a temperature sensor, both a cost reduction and the alternator control by appropriate generation voltages can be achieved.

The liquid temperature of the battery is substantially equal to an open air temperature in an equilibrium state. Then, the liquid temperature of the battery rises (or, increases) by receiving heat from the engine or by self-heating of the battery. However, the heating due to the battery's self-heating is lower than the heating due to the receipt of heat from the engine, as long as the charging of the battery is carried out by means of a voltage value below an overcharge voltage. Hence, the liquid temperature of the battery rises almost by receiving heat from the engine. Thereby, the liquid temperature of the battery is reliably equal to or higher than the open air temperature. Therefore, if the open air temperature can be accurately estimated, the possibility that the liquid temperature at the time of start(up) of the engine is estimated as some value much higher than its actual value (i.e., actual liquid temperature of the battery) is reduced. Namely, in order to assuredly prevent charging shortage of the battery, it is desirable to accurately estimate the open air temperature without the liquid temperature of the battery being estimated at a higher value than its actual value, then, to control (or adjust, or regulate) the alternator at optimal generation voltages, and thereby to improve the fuel economy of the vehicle.

Therefore, in this embodiment according to the present invention, the liquid temperature of the battery which is used to calculate the generation-voltage command value of the alternator is estimated in consideration of the open air temperature, as will be described below.

Figure 3:
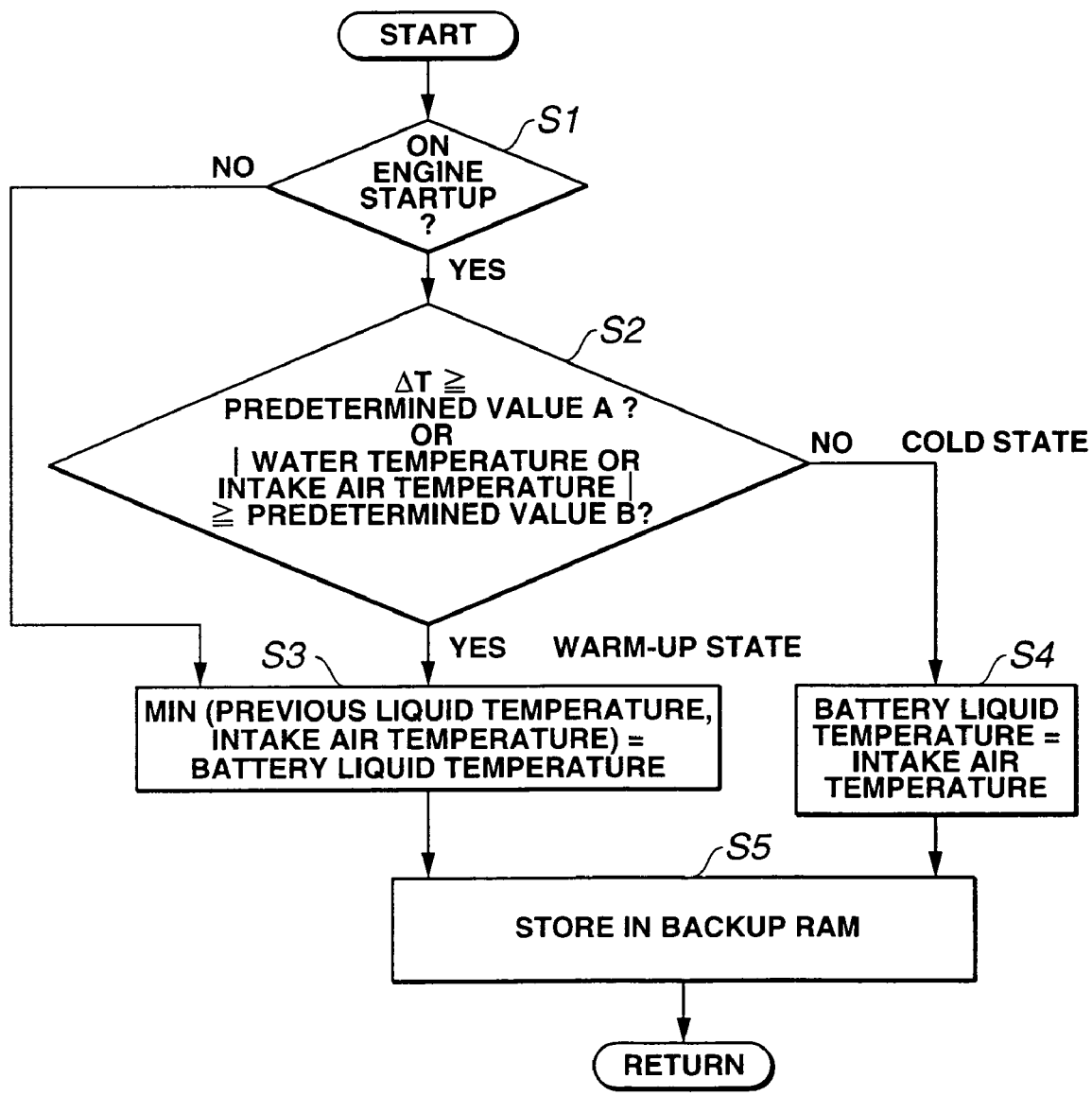
FIG. 3 is a flowchart showing a control process for estimating liquid temperature of the battery.

FIG. 3 is a flowchart showing a control process performed by the above-described control unit 4 when estimating the liquid temperature of battery 3.

At step S1 corresponding to an engine startup determining section (means), control unit 4 determines whether or not engine 2 is presently on startup (or, on starting of engine 2). Namely, control unit 4 examines whether engine 2 is in the state of an engine startup. If control unit 4 determines (or, judges) that engine 2 is on (or, during) engine startup, the program proceeds to step S2. On the other hand, if engine 2 is not on engine startup, namely if engine 2 is after engine startup, the program proceeds to step S3. Explanations about step S3 will be mentioned later.

At step S2 corresponding to an engine startup temperature-state determining (or, judging) section (or, means), control unit 4 determines whether a form (or, condition) of the startup of engine 2 is a warm-up starting or a cold (or, cool) starting, at the time of startup of engine 2. Namely, the warm-up starting means a startup (or, starting) in warm-up state of engine 2 (i.e., engine 2 has been already warmed up), and the cold starting means a startup in cold state of engine 2. At step S2, if (an absolute value of) a temperature difference $\Delta T$ is equal to or larger than a first predetermined value A, or at least one of an absolute value of the (cooling) water temperature of engine 2 sensed by water temperature sensor 5 (i.e., the present temperature of the cooling water of engine 2) and an absolute value of the intake air temperature sensed by intake air temperature sensor 6 (i.e., the present intake air temperature) is equal to or higher than a second predetermined value B; then control unit 4 determines engine 2 is starting in warm-up state and the program proceeds to step S3. On the other hand, if the answer of S2 is NO, control unit 4 determines engine 2 is starting in cold state and the program proceeds to step S4. The temperature difference $\Delta T$ is a difference between the sensed water temperature of engine 2 and the sensed intake air temperature. An upper limit (temperature) value up to which the open air temperature is able to vary, can be determined to some extent. Hence, by establishing such a criterion (or, limitation), namely, by setting the second predetermined value B, it becomes possible to identify the warm-up state or cold state in almost every situation. In addition, first predetermined value A and second predetermined value B are predetermined on the basis of specifications of the vehicle and other factors, for example, the first predetermined value A is set for equal to 6° C. (degrees centigrade) and the second predetermined value B is set for equal to 35° C.

These criteria for the absolute values of the water temperature (of engine 2) and intake air temperature are not limited to be set for an identical (or, a common) value as mentioned above. These criteria may be respectively set for different two values in consideration of variations of the sensors.

At step S3, control unit 4 compares the intake air temperature sensed by intake air temperature sensor 6 with a previous value (i.e., a value of last time around) of the liquid temperature of battery 3. Namely, this previous value is a (last stored) value of the liquid temperature which, at this time (i.e., currently), exists in a backup RAM (random-access memory) included in control unit 4. Then, control unit 4 regards the lower value of these temperatures as a present value of the liquid temperature of battery 3. In other words, at step S3, control unit 4 estimates the present battery's liquid temperature to be the lower one of the sensed (present) intake air temperature and the battery's liquid temperature last stored in the backup RAM, by comparing the sensed intake air temperature with the last stored battery's liquid temperature. Then, the program proceeds to step S5. At step S5 corresponding to a battery liquid temperature storing section (means), control unit 4 stores the battery liquid temperature determined (i.e., estimated) at step S3 or S4 in the backup RAM. In detail, in the case where engine 2 is starting in warm-up state (i.e., YES at step S2) or engine 2 is after the startup thereof (i.e., not startup, NO at step S1), control unit 4 accepts, as the present value of the liquid temperature of battery 3, the intake air temperature presently sensed by intake air temperature sensor 6 or the previous value of the liquid temperature whichever is lower. Moreover, the above-described backup RAM is configured to be able to memorize a (present) value of the liquid temperature of battery 3, at the time of shutdown of engine 2 by turning an engine key OFF. Namely, in the case where engine 2 is starting in warm-up state, control unit 4 compares the intake air temperature, with a value of the liquid temperature which was stored at the time when the engine key last turned OFF (i.e., at the time of last shutdown of engine 2) as the previous value of the liquid temperature of battery 3. Then, control unit 4 determines the present value of the liquid temperature of battery 3 by employing the lower value of these temperatures. This is performed to reduce the possibility that the intake air temperature is measured (or, determined) to be higher temperature than its actual (i.e., real) temperature due to an interference (or, influence) of heat within an engine room while engine 2 is starting in warm-up state.

At step S4, control unit 4 determines the present value of the liquid temperature of battery 3 by setting the liquid temperature of battery 3 for a value of the intake air temperature sensed by intake air temperature sensor 6. In other words, at step S4, control unit 4 estimates the present battery's liquid temperature to be the sensed (present) intake air temperature at the time of engine startup in cold state. Then, the program proceeds to step S5. Namely, while (or, in the case where) engine 2 is starting in cold state, the liquid temperature of battery 3 is regarded as the intake air temperature. This process at step S4 is carried out, since the intake air temperature is substantially equal to the water temperature of engine 2 while engine 2 is starting in cold state. This is because respective temperature parameters in the vehicle are in an equilibrium state while engine 2 is starting in cold state. In addition, steps S3 and S4 correspond to a battery liquid temperature estimating section (means).

At step S5, control unit 4 stores the battery liquid temperature determined at step S3 or S4 in the backup RAM. Then, control unit 4 calculates the generation-voltage command value for alternator 1 in accordance with the estimated (or, determined) battery liquid temperature. And alternator 1 charges battery 3 with generation voltages based on the generation-voltage command value.

In addition, at step S5, control unit 4 may be configured to rewrite the backup RAM to change the battery liquid temperature previously stored in the backup RAM to that presently determined at step S3 or S4.

As explained above, in this embodiment, the open air temperature is accurately estimated by judging whether the warm-up starting or the cold starting of the engine. Hence, the inconvenience that the liquid temperature of the battery is estimated to be a higher temperature than its actual temperature, can be effectively prevented (or, reduced). This is because the estimated open air temperature is regarded as the battery liquid temperature, considering the fact that the (actual) battery liquid temperature can hardly become lower than the (actual) open air temperature.

Therefore, the charging shortage of the battery can be avoided when the open air temperature is relatively low, and the battery liquid temperature is rarely estimated to be remarkably lower as compared to the actual temperature of the battery liquid temperature when the open air temperature is relatively high. Namely, since the process of step S4 is carried out while the engine is starting in cold state (e.g., for the first time of engine startup in some environment), the battery liquid temperature is rarely estimated to be remarkably lower temperature than its actual temperature even in the case where the open air temperature is relatively high. Therefore, optimum generation voltages of the alternator can be provided (or, set).

In addition, in this embodiment, control unit 4 includes a battery liquid temperature estimating section (means) as a software system as shown in the flowchart of FIG. 3.

This application is based on a prior Japanese Patent Application No. 2004-183167 filed on Jun. 22, 2004. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A generator control apparatus for an automotive vehicle, comprising:
   an engine;
   an intake air temperature sensing section configured to sense a temperature of intake air of the engine;
   an engine startup temperature-state determining section configured to determine whether the engine is in warm-up state, at the time of startup of the engine;
   a battery;
   a battery liquid temperature estimating section configured to estimate a liquid temperature of the battery;
   a battery liquid temperature storing section configured to store the battery liquid temperature estimated by the battery liquid temperature estimating section,
   the battery liquid temperature estimating section being configured to estimate, at the time of engine startup in warm-up state, the battery liquid temperature to be the lower one of the sensed intake air temperature and a battery liquid temperature previously stored by the battery liquid temperature storing section, by comparing the sensed intake air temperature with the previously stored battery liquid temperature; and a generator configured to charge the battery in accordance with the estimated battery liquid temperature.

2. The generator control apparatus as claimed in claim 1, wherein the engine startup temperature-state determining section is configured to determine whether the engine is in warm-up state or in cold state, at the time of startup of the engine; and the battery liquid temperature estimating section is configured to estimate the battery liquid temperature to be the sensed intake air temperature, at the time of engine startup in cold state.

3. The generator control apparatus as claimed in claim 1, wherein the previously stored battery liquid temperature is a temperature which is stored by the battery liquid temperature storing section at the last time.

4. The generator control apparatus as claimed in claim 1, wherein the generator control apparatus further comprises an engine water temperature sensing section configured to sense a temperature of cooling water of the engine at the time of startup of the engine; and the engine startup temperature-state determining section is configured to determine that the engine is in warm-up state in the case where a temperature difference between the sensed cooling water's temperature and the intake air temperature is equal to or larger than a predetermined value.

5. The generator control apparatus as claimed in claim 1, wherein the generator control apparatus further comprises an engine water temperature sensing section configured to sense a temperature of cooling water of the engine at the time of startup of the engine; and the engine startup temperature-state determining section is configured to determine that the engine is in warm-up state, in the case where at least one of an absolute value of the cooling water's temperature and an absolute value of the intake air temperature is equal to or larger than a corresponding predetermined value.

6. The generator control apparatus as claimed in claim 1, wherein the generator control apparatus further comprises an engine water temperature sensing section configured to sense a temperature of cooling water of the engine; and the engine startup temperature-state determining section is configured to determine that the engine is in warm-up state, in the case where a temperature difference between the sensed cooling water temperature and the intake air temperature is equal to or larger than a first predetermined value, or in the case where at least one of an absolute value of the cooling water temperature and an absolute value of the intake air temperature is equal to or larger than a second predetermined value.

7. The generator control apparatus as claimed in claim 6, wherein the battery liquid temperature storing section is configured to store the battery liquid temperature estimated by the battery liquid temperature estimating section, in a backup RAM.

8. The generator control apparatus as claimed in claim 1, wherein the generator control apparatus further comprises an engine startup determining section configured to determine whether or not the engine is presently on startup; and the battery liquid temperature estimating section is configured to estimate the battery liquid temperature to be the lower one of the sensed intake air temperature and the battery liquid temperature previously stored by the battery liquid temperature storing section if the engine startup determining section determines that the engine is not on startup.

9. The generator control apparatus as claimed in claim 1, wherein the previously stored battery liquid temperature is a temperature which is stored by the battery liquid temperature storing section at the time of last shutdown of the engine.

10. The generator control apparatus as claimed in claim 9, wherein the intake air temperature sensing section senses the intake air temperature at the time of startup of the engine; and the previously stored battery liquid temperature is compared with the sensed present intake air temperature.

11. The generator control apparatus as claimed in claim 1, wherein the generator is configured to charge the battery with generation voltage of the generator controlled in accordance with the estimated battery liquid temperature.

12. The generator control apparatus as claimed in claim 11, wherein the generation voltage of the generator is controlled in accordance with the estimated battery liquid temperature, a running state of the vehicle, and a charged status of the battery.

13. The generator control apparatus as claimed in claim 11, wherein the generation voltage of the generator becomes higher as the estimated battery liquid temperature becomes lower.

14. The generator control apparatus as claimed in claim 13, wherein the generation voltage of the generator becomes higher as the charged status of the battery becomes lower.

15. A generator control method for a vehicle, comprising:
sensing a temperature of intake air of an engine at the time of startup of the engine;
determining whether the engine is in warm-up state, at the time of startup of the engine;
estimating, at the time of engine startup in warm-up state, a battery liquid temperature to be the lower one of the sensed intake air temperature and a previously stored battery liquid temperature, by comparing the sensed intake air temperature with the previously stored battery liquid temperature;
storing the estimated battery liquid temperature; and
charging the battery in accordance with the estimated battery liquid temperature.

16. A generator control apparatus for a vehicle, comprising:
an engine;
intake air temperature sensing means for sensing a temperature of intake air of the engine;
engine startup temperature-state determining means for determining whether the engine is in warm-up state, at the time of startup of the engine;
a battery;
battery liquid temperature estimating means for estimating a liquid temperature of the battery;
battery liquid temperature storing means for storing the battery liquid temperature estimated by the battery liquid temperature estimating means,
the battery liquid temperature estimating means being configured to estimate, at the time of engine startup in warm-up state, the battery liquid temperature to be the lower one of the sensed intake air temperature and a battery liquid temperature previously stored by the battery liquid temperature storing means, by comparing the sensed intake air temperature with the previously stored battery liquid temperature; and
generation means for charging the battery in accordance with the estimated battery liquid temperature.

* * * * *